United States Patent
Chang et al.

(10) Patent No.: US 6,907,411 B2
(45) Date of Patent: Jun. 14, 2005

(54) CARRIER DISPATCH AND TRANSFER METHOD

(75) Inventors: Shaw-Ching Chang, Taipei (TW); Ming-Wen Tsai, Taipei (TW); Chih-Wei Huang, Taipei (TW); Yu-Chi Chung, Taipei (TW)

(73) Assignee: Institute For Information Industry, Taipei (TW)

( * ) Notice: Subject to any disclaimer, the term of this patent is extended or adjusted under 35 U.S.C. 154(b) by 443 days.

(21) Appl. No.: 09/986,032

(22) Filed: Nov. 7, 2001

(65) Prior Publication Data

US 2003/0069864 A1 Apr. 10, 2003

(51) Int. Cl.$^7$ .............................................. G06F 15/18
(52) U.S. Cl. ....................................................... 706/13
(58) Field of Search ........................................... 706/13

(56) References Cited

U.S. PATENT DOCUMENTS 6,137,898 A * 10/2000 Broussard et al. .......... 382/132
6,493,686 B1 * 12/2002 Francone et al. ............. 706/12

OTHER PUBLICATIONS

Silva et al, "GENOM: Circuit–Level optimizer Based on a Modified Genetic Algorithm Kernel", IEEE International Symposium on Circuits and Systems, May 2002.*

Vaz et al, "A General–purpose Kernel Based on Genetic Algorithm for optimization of Complex Analog Circuits" IEEE International symposium on Circuit and Systems, Aug. 2001.*

* cited by examiner

Primary Examiner—George Davis
(74) Attorney, Agent, or Firm—Bacon & Thomas, PLLC

(57) ABSTRACT

A carrier dispatch and transfer method is disclosed, which actuates an optimal carrier dispatch and transfer table for generating elements with a kernel of genetic algorithm by a multi-thread method to search setting confinement conditions and object. A plurality of samples are generated randomly, each including a two dimensional carrier dispatch encoding table. The carrier dispatch encoding table and its transportation duties correspond to chromosomes and genes in a genetic algorithm. The samples are utilized as parent generations for being estimated according to a defined object function and a confinement formula. By rule of roulette wheel, selection possibilities of chromosomes with relative superior fitness values are enhanced. After performing processes of chromosome crossover and mutation, a process of sample update is performed by local gene exchange to select superior samples based on the fitness values.

13 Claims, 5 Drawing Sheets

|     | $d_1$ | $d_2$ | $d_3$ | ............ | $d_{\beta-1}$ | $d_\beta$ |
| --- | --- | --- | --- | --- | --- | --- |
| $p_1$ | $W_{11}$ | $W_{12}$ | $W_{13}$ | ............ | $W_{1\beta-1}$ | $W_{1\beta}$ — 41 |
| $p_2$ | $W_{21}$ | $W_{22}$ | $W_{23}$ | ............ | $W_{2\beta-1}$ | $W_{2\beta}$ |
| ⋮ | | | | ⋮ | | |
| $p_\alpha$ | $W_\alpha$ | $W_{\alpha 2}$ | $W_{\alpha 3}$ | | $W_{\alpha\beta-1}$ | $W_{\alpha\beta}$ — 41 |

FIG. 4A

|  | Flight 1 | Flight 2 |
| --- | --- | --- |
| Carrier1 | 812 | 813 |
| Carrier2 | 822 | 838 |

FIG. 4B

CARRIER DISPATCH AND TRANSFER METHOD

BACKGROUND OF THE INVENTION

1. Field of the Invention

The present invention relates to carrier dispatch and transfer method, and particularly to a carrier dispatch and transfer method based on a genetic algorithm of a two dimensional matrix encoding.

2. Description of Related Art

In the field of transportation, transportation resource means the tools which may be used in the carrier dispatch and transfer, including the carriers and the transportation duty members. The carriers include sea, land or air transportation vehicles for transferring passengers or duty members, such as airplanes, passenger trains, container cars, or cabinets of trains. The transportation duty members include drivers of vehicles for driving the vehicles or service members for providing services to passengers. The dispatch of transportation resource is executed based on the flight table of the transportation network, the dispatch of the transportation network dispatch, and dispatch results. The dispatch of the transportation network will cause that the combinations of the carrier dispatch and transfer table increases exponentially due to the kinds and number of the transportation times. Besides, when the carrier dispatch and transfer table is generated, the carrier preparing time, the flight time without refueling, the time that the carrier is not in a maintenance base, the meal time of the service members, the flight transportation time and sizes of the carriers must be taken into consideration. Therefore, it is very inefficient to generate the carrier dispatch and transfer table manually. Furthermore, an optimal carrier dispatch and transfer table can not be generated in a limited time. As a result, the management can not meet the requirement of the market and the labors can not be dispatched efficiently.

U.S. Pat. No. 5,848,403 discloses a "System and method for genetic algorithm scheduling systems", wherein a genetic algorithm is used in the carrier dispatch and transfer table. However, the genetic algorithm employs a one-dimensional linear or serial encoding manner. It is insufficient in expressing a problem and thus the user can not understand the problem easily. As a consequence, it is difficult to get a solution. Therefore, it is desirable to provide an improved carrier dispatch and transfer method to mitigate and/or obviate the aforementioned problems.

SUMMARY OF THE INVENTION

Accordingly, the object of the present invention is to provide a carrier dispatch and transfer method, which sufficiently expresses the characteristics of a problem and thus has a high efficiency for getting a solution. A multi-thread method is used to achieve a structure in that the system operation and the problem resolving are independently performed so as to improve the efficiency of using system resources and the development of a system.

To achieve the object, the present invention provides a carrier dispatch and transfer method, which comprises the steps of: (A) setting basic data about the dispatch of carriers; and (B) actuating an optimal carrier dispatch and transfer table for generating elements with a kernel of genetic algorithm by a multi-thread method to search setting confinement conditions and object, and comprising the steps of: (B1) generating a plurality of initial samples randomly, each initial sample including a two dimensional carrier dispatch encoding table having a plurality of transportation duties, the carrier dispatch encoding table having longitudinal indexes for representing carriers and transversal indexes for representing time sequences, the carrier dispatch encoding table and its transportation duties corresponding to chromosomes and genes in a genetic algorithm; (B2) utilizing the samples as parent generations, and estimating the samples according to a defined object function and a confinement formula for getting fitness values of the samples of the chromosomes; (B3) by rule of roulette wheel, enhancing selection possibilities of chromosomes with relative superior fitness values; (B4) performing processes of chromosome crossover and mutation by the selection possibilities of single point cutting and double point cutting; (B5) performing a process of sample update by local gene exchange, wherein a fitness value of each sample is determined from the object function and a disobeying cost of the confinement formula; and (B6) when the processes executed having achieved a limited value or the disobeying number of the confinement formula is zero, and variation of the sample fitness value is within a preset value, the process being ended; otherwise, utilizing the acquired samples as a parent generation and repeating the steps of (B2) to (B5).

Other objects, advantages, and novel features of the invention will become more apparent from the following detailed description when taken in conjunction with the accompanying drawings.

BRIEF DESCRIPTION OF THE DRAWINGS

FIG. 4A is a 2-dimensional carrier dispatch encoding table including a plurality of transportation duties.

FIG. 4B shows an example of the carrier dispatch encoding table having four transportation duties.

DETAILED DESCRIPTION OF THE PREFERRED EMBODIMENT

Figure 1:
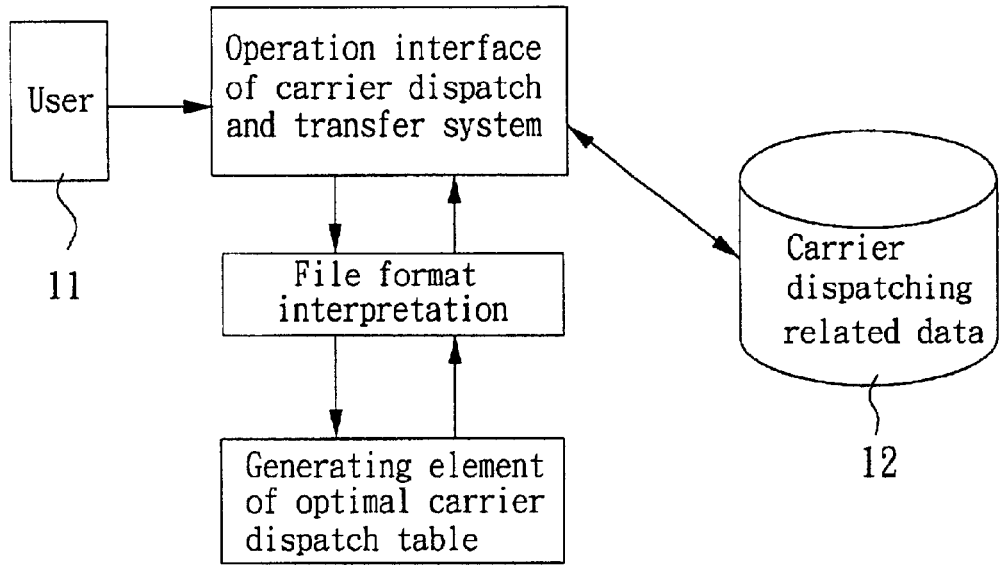
FIG. 1 is a system structural view showing that the carrier dispatch and transfer method of the present invention is applied thereto.

A preferred embodiment of a carrier dispatch and transfer method in accordance with the present invention is described in the following. With reference to FIG. 1, a system structural view of the present invention is illustrated. In this embodiment, a client/server data accessing structure is disclosed for accessing the carrier dispatch and transfer data. The user of the client end 11 requests a carrier dispatch and transfer table to the server end 12 through a network for generating related data.

Figure 2:
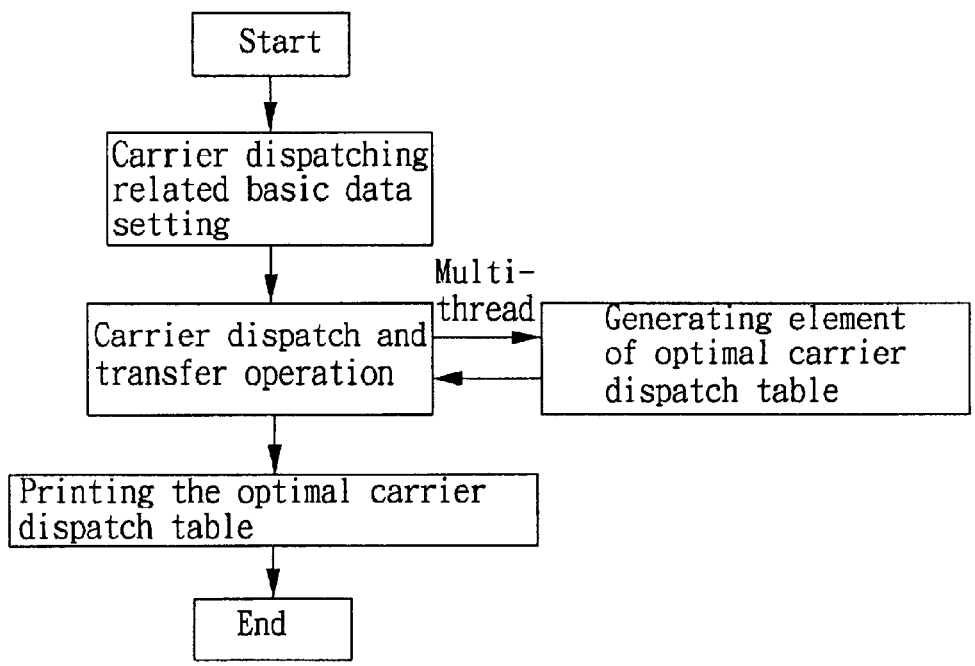
FIG. 2 shows an operation flow diagram of a carrier dispatch and transfer system of the present invention.

Referring to FIG. 2, the client end 11 completes the basic data setting about carrier dispatch through a system operation interface. Thereby, the interpretation of the data format, an optimal carrier dispatch and transfer table for generating elements with a kernel of genetic algorithm is actuated by a multi-thread method. After searching the setting confinement and object, an optimized carrier dispatch and transfer table is generated, which will be outputted to a general computer output device.

Figure 3:
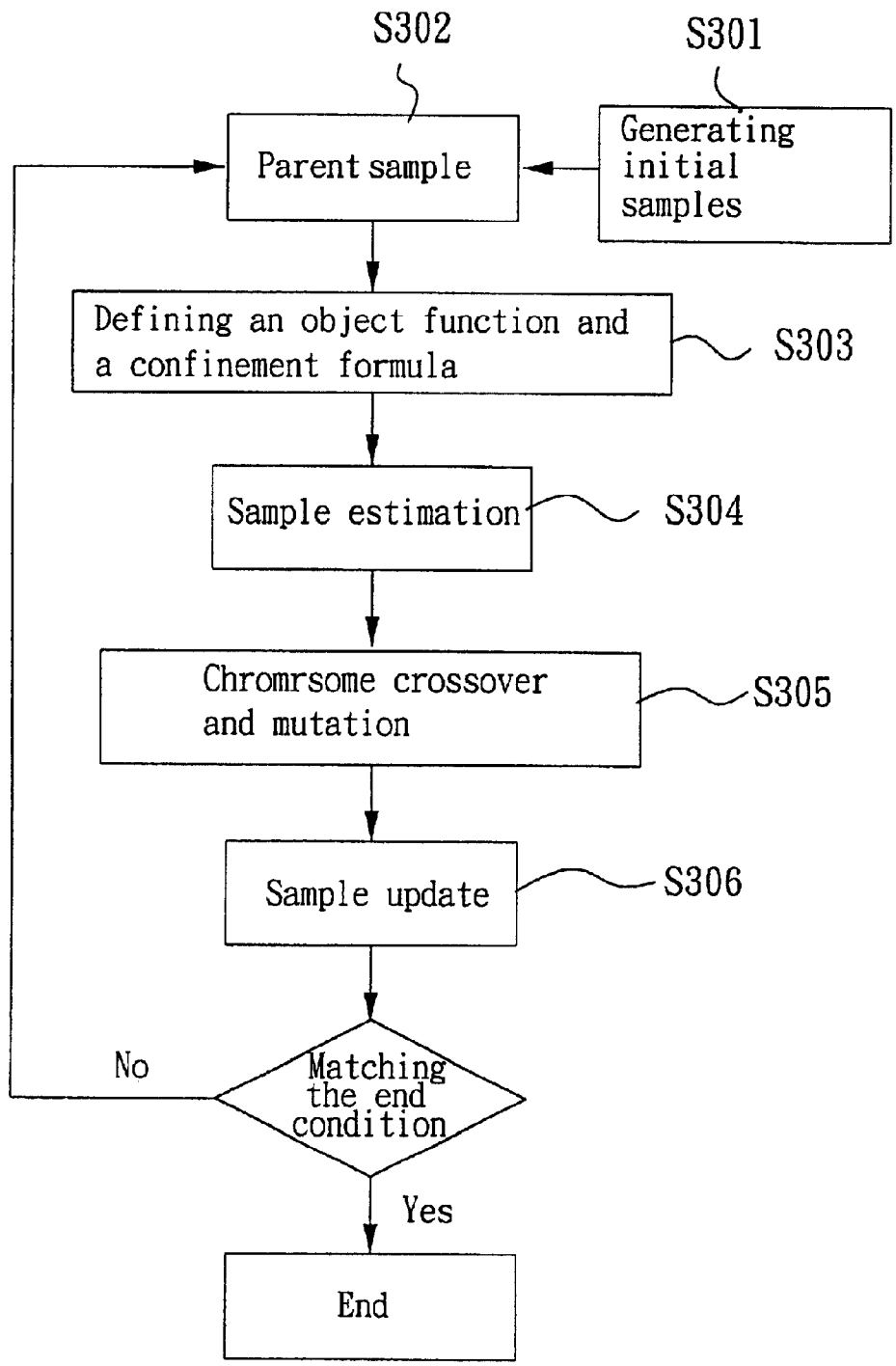
FIG. 3 is a flow diagram of an optimal carrier dispatch and transfer table for generating elements.

FIG. 3 shows the flow of the components of the optimized carrier dispatch encoding table. At first, a plurality of initial samples is generated randomly (step S301). Each initial sample includes a two dimensional carrier dispatch coding table comprising a plurality of transportation duties 41. The longitudinal indexes $p_1, \ldots, p_\alpha$ represents a carrier 1, a carrier 2, ..., and a carrier α, and the transversal indexes $d_1, \ldots, d_\beta$ represents a time sequence 1, a time sequence 2, ..., and a time sequence β. The coding value $\omega_{\alpha\beta}$ represents the number of the transportation duty. For example, if the carrier is a plane and the time table for plane planes is shown as table:

TABLE 1

| Flight | Takeoff time | Landing time | ID of takeoff airport | ID of landing airport | Flying time |
|---|---|---|---|---|---|
| 812 | 1010 | 1100 | 7 | 17 | 50 |
| 813 | 1020 | 1110 | 17 | 7 | 50 |
| 822 | 1430 | 1520 | 7 | 17 | 50 |
| 838 | 2100 | 2150 | 7 | 17 | 50 |

Then, the sample is the carrier dispatch-encoding table comprising four transportation duties, as shown in FIG. 4B. The carrier dispatch table is corresponding to one chromosome in the genetic algorithm. Each transportation duty in the carrier dispatch-encoding table is corresponding to a gene.

Figure 5:
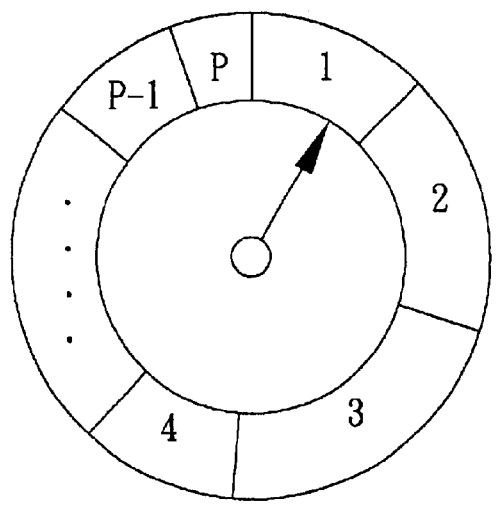
FIG. 5 is a schematic view showing the process of deleting in roulette wheel rule.

Sample of first generation generated randomly is used as a parent sample (step 302). It is obvious that these samples can not satisfy the predetermined object function and definition of confinement (step 302). From sample estimation (step 302), it is known that the differences of the fitness value of chromosomes are large. Thus, rule of roulette wheel is used so that chromosomes with superior fitness values have a large possibility to be selected and thus bad samples can be deleted. FIG. 5 is a schematic view showing the use of roulette wheel rule to delete samples. In the figure, 1, ..., P are possibilities of P selected samples. In the rule of roulette wheel, each gene has a selected possibility according to the fitness value. Therefore, the sample having a superior fitness value is assigned with a large possibility of being selected. Meanwhile, the part of the samples having inferior fitness values and possibly having superior genes locally are remained so as to remain the possibility for improvement.

Figure 6:
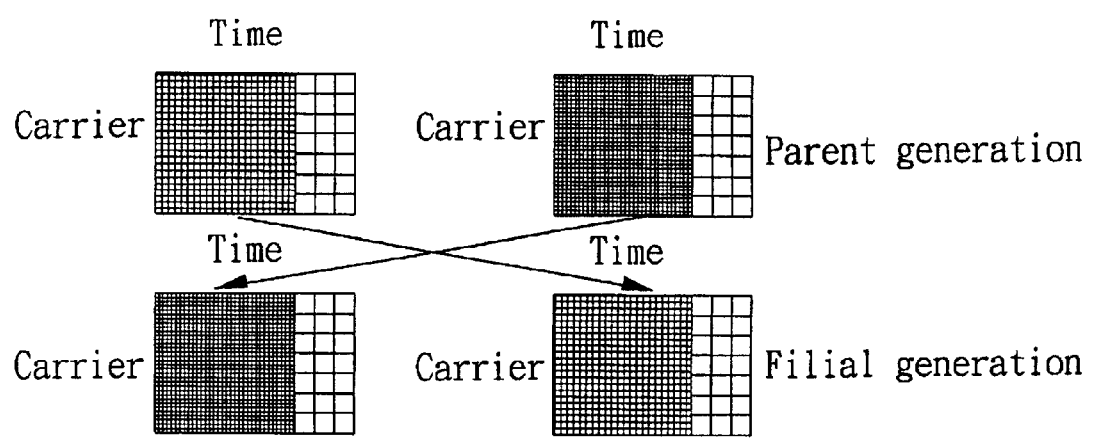
FIG. 6 is a schematic view of chromosome crossover.

The chromosome crossover process and gene mutation processes are performed in step 305. The gene crossover generates the filial generation from a superior parent generation so that the evolution of each generation is better than the former generation. Since the daily transportation duty and content can not be changed after they are determined. To assure the correction of the daily transportation duties, in the chromosome crossover process, the chromosome is cut longitudinally, as shown in FIG. 6. In chromosome crossover process, if the selection possibility is larger than the predetermined possibility, the chromosome crossover is performed by a two point cutting process. If not, a single point cutting process in the chromosome crossover process is performed.

Figure 7:
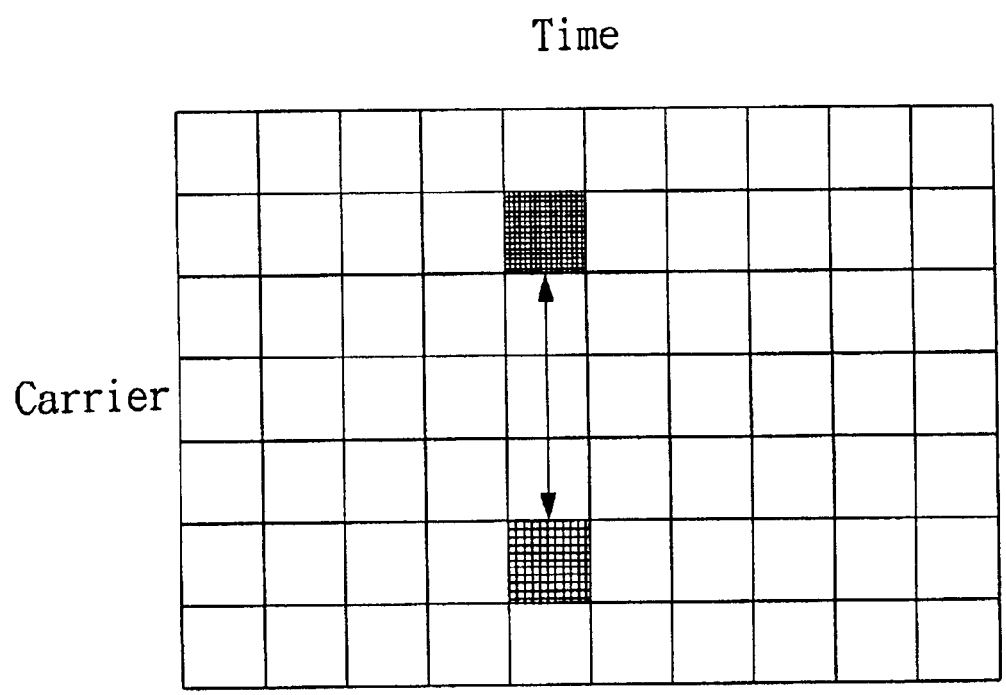
FIG. 7 is a schematic view showing the process of the mutation.

In mutation, a local gene exchange method is used so that the samples are diversified to expand the searching space of the samples and to avoid getting a local optimal solution. As the chromosome crossover method, the mutation must assure the correction of the daily transportation duties and the contents. Therefore, the mutation is confined in the exchange of daily transportation duties. If the selected possibility is larger than a preset possibility, the time for mutation is selected at first. Next, a carrier for mutation is searched, and two carriers at that time are interchanged. If not, no mutation is performed. The mutation is illustrated in FIG. 7.

After the step of chromosome crossover, the step of sample update is performed (step 306). In this step, the samples are ordered based on the fitness values of the chromosomes and the samples with superior chromosomes are selected (for example, samples with lower fitness values). The score of each sample may be acquired from assembling object function values. For example, the object function is divided into two parts. One is the minimization of the working cost and the average level of a fairness indicator, and the other is the unsatisfied level of each confining equation. For the carrier, the related confinement is listed in the following:

1. Time for preparing carriers: the time for clearing or checking the carriers between different fights.
2. Time of flying without refueling (flying time of the carriers): total flying time that the carriers are unnecessary to add fuel.
3. Time that the carrier is not in a maintenance base (time interval for maintaining): time interval that the carriers must be maintained and repaired.
4. Mealtime of the service members: it providing a fixed meal time to the service members.
5. Transportation time of fight: the carrier transportation time of the carrier in the time table from the initial point to the ending point.

The disobeying cost of the confinement is the product of the number of times that the chromosomes disobey the confinement and the corresponding penalty value. For a possible solution, the disobey cost of the confinement is zero. It can be represented by a mathematical equation as follows:

$$\text{Penalty\_Cons} = PConsModTurnArround * NConsModTurnArround +$$
$$PConsModCruise * NConsModCruise +$$
$$PConsModMaintain * NConsModMaintain +$$
$$PConsMealTm * NConsMealTm +$$
$$PConsTripTm * NConsTripTm,$$

where PconsModTurnArround is the confinement penalty value for reducing the carrier preparing time; NconsMod-TurnArround is the total number of disobeying the carrier preparing time in some sample; PconsModCruise is the confinement penalty value for reducing the carrier flying time; NconsModCruise is the total number of all the carrier flying confining time; PconsModMaintain is the confinement penalty value for reducing the time interval of disobeying carrier maintenance time; NconsModMaintain is the total number of times of disobeying the confinement of carrier maintenance time intervals; PconsMealTm is the confinement penalty value for reducing the disobey of service members mealtime; NconsMealTm is the total number of times of disobeying the service member meal time confinement in some samples; PconsTripTm is the confinement penalty value for reducing the disobey of the carrier flight time; and NconsTripTm is the total of times of disobeying the carrier flight time confinement in some samples.

Furthermore, the working cost and fairness indicator of the carrier includes:

1. Efficiency of using a carrier (FIFO estimation): for minimizing the total of the flight connecting times, which can be represented as:

$$Cost\_FIFO = \sum_{i=1}^{n-1} TmTurnArround_{i,i+1} * W_{TmTurnArround},$$

where Cost_FIFO is cost of an overlarge flight connecting time; $TmTurnArround_{i,i+1}$ is the time interval of the i-th and (i+1)-th flight, $W_{TmTurnArround}$ is the weight for reducing the flight connecting total time.

2. The same initial and end points for continuous flights (carrier dispatch cost): the consistence of the former flight and the present flight, which can be represented as:

$$Cost\_ModDispatch = \sum_{i=1}^{n-1} NConnect_{i,i+1} * W_{Connect}$$

where $NConnect_{i,i+1}$ is the number of different flight connecting positions; $W_{Connect}$ is the weight for reducing the carrier dispatch cost.

Therefore, the chromosome object function mainly includes a maximization of the flight utilization and the confinement disobey penalty cost, and it can be represented as:

SCORE=Cost_FIFO+Cost_ModDispatch+Penalty_Cons,

For example, for the chromosomes in FIG. 4B, if only the carrier preparing time confinement and the carrier dispatch cost are considered, and PconModTurnAround=50, $W_{connect}$=100, we have:

Score = Penalty_Cons + Cost_ModDispatch

= (1 + 0)×50 + (0 + 1)×100

Therefore, 812 and 813 disobey the carrier preparing time confinement, and 822 and 838 are not consisted in takeoff place and landing place. Thereby, the carrier dispatch cost is increased. However, a usable sample fitness value only includes the carrier utilization efficiency, as the following:

SCORE=Cost_FIFO+Cost_ModDispatcho

Therefore, it is only necessary to determine whether the number of disobeying of the confinement formula is equal to zero. Then it can determine whether the solution is usable. The end condition of the algorithm can be such that, when the total confinement or the disobeying number is zero, the variation of the sample fitness value is within 0.001, as representing by the following formula:

$$\frac{|SCORE_g - SCORE_{g-1}|}{SCORE_{g-1}} < 0.001,$$

where $SCORE_g$ and $SCORE_{g-1}$ is the sample fitness value of the present time and previous time when the disobeying number is zero. On the contrary, if the ending condition is not matched, the acquired sample is used as a parent sample, and then the processes step 302 to step 306 are performed. These processes are performed repeatedly until an ending condition is matched. As a result, an optimal result is acquired.

It is appreciated from above description that in the genetic algorithm of the present invention, a 2 dimensional matrix encoding method is used so as to have a higher efficiency and a multi-thread method is used in the system operation. The algorithm is operated independently and a parallel operation is used to improve the efficiency of the system resource and the system developing time schedule.

Although the present invention has been explained in relation to its preferred embodiment, it is to be understood that many other possible modifications and variations can be made without departing from the spirit and scope of the invention as hereinafter claimed.

What is claimed is:

1. A carrier dispatch and transfer method comprising the steps of:
   (A) setting basic data about the dispatch of carriers;
   (B) actuating an optimal carrier dispatch and transfer table for generating elements with a kernel of genetic algorithm by a multi-thread method to search setting confinement conditions and object, and comprising the steps of:
   (B1) generating a plurality of initial samples randomly, each initial sample including a two dimensional carrier dispatch encoding table having a plurality of transportation duties, the carrier dispatch encoding table having longitudinal indexes for representing carriers and transversal indexes for representing time sequences, the carrier dispatch encoding table and its transportation duties corresponding to chromosomes and genes in a genetic algorithm;
   (B2) utilizing the samples as parent generations, and estimating the samples that correspond to respective said chromosomes according to a defined object function and a confinement formula for getting fitness values of the samples corresponding to the respective chromosomes;
   (B3) by rule of roulette wheel, enhancing selection possibilities of chromosomes with relative superior fitness values;
   (B4) performing processes of chromosome crossover and mutation by the selection possibilities of single point cutting and double point cutting;
   (B5) performing a process of sample update by local gene exchange, wherein a fitness value of each sample is determined from the object function and a disobeying cost of the confinement formula; and
   (B6) when the processes executed have achieved a limited value or the disobeying number of the confinement formula is zero, and variation of the sample fitness value is withing a preset value, ending the process; otherwise, utilizing the acquired samples as a parent generation and repeating the steps of (B2) to (B5).

2. The carrier dispatch and transfer method as claimed in claim 1, wherein in step (B3), the selection possibility is responsive to the fitness value of each chromosome.

3. The carrier dispatch and transfer method as claimed in claim 1, wherein in step (B4), the chromosome crossover is performed by exchanging gene groups for generating filial generations from superior parent generations.

4. The carrier dispatch and transfer method as claimed in claim 3, wherein in the chromosome crossover, the chromosome is cut longitudinally.

5. The carrier dispatch and transfer method as claimed in claim 4, wherein in the crossover, if the selection possibility is larger than a predetermined possibility, the chromosome crossover is performed by a two point cutting process, and if not, a single point cutting process is performed in the chromosome crossover process.

6. The carrier dispatch and transfer method as claimed in claim 1, wherein in the mutation of step (B4), a partial gene exchange method is utilized, so that a variety of samples are generated and a searching space of the samples is enlarged to avoid getting a local optimal solution.

7. The carrier dispatch and transfer method as claimed in claim 6, wherein in mutation, if the selected possibility is larger than a preset possibility, a time for mutation is selected, and a carrier resource for performing mutation is searched and two carrier resources in the time are exchanged.

8. The carrier dispatch and transfer method as claimed in claim 1, further comprising a step (C) for outputting an optimal carrier dispatch and transfer table.

9. The carrier dispatch and transfer method as claimed in claim 1, wherein the confinement conditions include carrier preparing time, flight time without refueling, time that the carrier is not in a maintenance base, mealtime of the service members, and flight transportation time.

10. The carrier dispatch and transfer method as claimed in claim 9, wherein the disobeying cost of the confinement is the product of the number of times that the chromosomes disobey the confinement and the corresponding penalty value.

11. The carrier dispatch and transfer method as claimed in claim 9, wherein the chromosome object function comprises an efficiency of a carrier and the same takeoff and landing place of continuous flights.

12. The carrier dispatch and transfer method as claimed in claim 11, wherein the fitness value of the chromosome is:

$$SCORE = Cost\_FIFO + Cost\_ModDispatch + Penalty\_Cons$$

where Cost_FIFO is the cost that a flight connecting time is too long; Cost_ModDispatch is the cost of carrier dispatch; and Penalty_Cons is the confinement disobeying cost.

13. The carrier dispatch and transfer method as claimed in claim 12, wherein the Penalty_Cons is zero.

* * * * *